(12) United States Patent
Akkarakaran et al.

(10) Patent No.: US 11,924,767 B2
(45) Date of Patent: Mar. 5, 2024

(54) SIDELINK CLOSED-LOOP TRANSMIT POWER CONTROL COMMAND PROCESSING

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Juan Montojo, San Diego, CA (US); Jung Ho Ryu, Fort Lee, NJ (US); Kapil Gulati, Hillsborough, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/947,578

(22) Filed: Aug. 6, 2020

(65) Prior Publication Data

US 2021/0045063 A1 Feb. 11, 2021

Related U.S. Application Data

(60) Provisional application No. 62/884,632, filed on Aug. 8, 2019.

(51) Int. Cl.
*H04W 52/14* (2009.01)
*H04W 52/08* (2009.01)
(Continued)

(52) U.S. Cl.
CPC ......... *H04W 52/143* (2013.01); *H04W 52/08* (2013.01); *H04W 52/367* (2013.01); *H04W 92/18* (2013.01)

(58) Field of Classification Search
CPC . H04W 52/367; H04W 52/08; H04W 52/143; H04W 92/18
See application file for complete search history.

(56) References Cited

U.S. PATENT DOCUMENTS

2022/0039021 A1\* 2/2022 Ryu .................... H04W 52/242

FOREIGN PATENT DOCUMENTS

CN 106233793 A 12/2016
EP 2651047 A2 10/2013
(Continued)

OTHER PUBLICATIONS

International Search Report and Written Opinion—PCT/US2020/070383—ISA/EPO—dated Oct. 26, 2020.

*Primary Examiner* — Elton Williams
(74) *Attorney, Agent, or Firm* — Sevan Savsa; Harrity & Harrity, LLP

(57) ABSTRACT

Various aspects of the present disclosure generally relate to wireless communication. In some aspects, a user equipment (UE) may receive a transmit power control (TPC) command that is based at least in part on a scheduled transmission of a sidelink communication. The UE may determine, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command. The UE may selectively adjust the transmit power of the UE based at least in part on determining whether to adjust the transmit power. Numerous other aspects are provided.

20 Claims, 5 Drawing Sheets

(51) Int. Cl.
*H04W 52/36* (2009.01)
*H04W 92/18* (2009.01)

(56) References Cited

FOREIGN PATENT DOCUMENTS

| | | | |
|---|---|---|---|
| WO | WO-2012077971 A2 | 6/2012 | |
| WO | WO-2015163638 A1 * | 10/2015 | ............ H04W 24/10 |
| WO | 2016019545 A1 | 2/2016 | |
| WO | 2016123402 A1 | 8/2016 | |
| WO | WO-2016123402 A1 * | 8/2016 | ......... H04L 27/0006 |

* cited by examiner

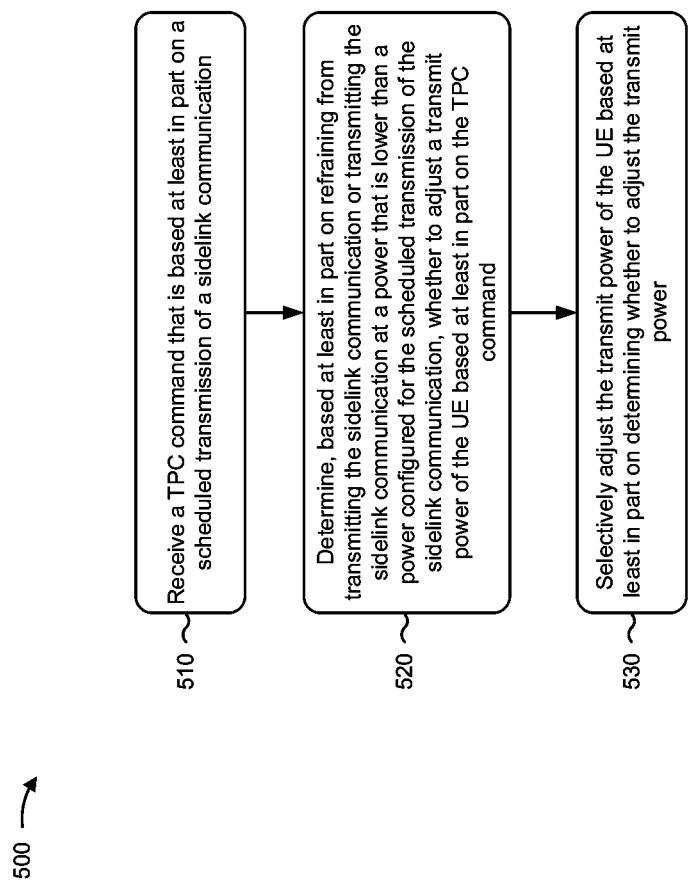

SIDELINK CLOSED-LOOP TRANSMIT POWER CONTROL COMMAND PROCESSING

CROSS-REFERENCE TO RELATED APPLICATION

This Patent Application claims priority to U.S. Provisional Patent Application No. 62/884,632, filed on Aug. 8, 2019, entitled "SIDELINK CLOSED-LOOP TRANSMIT POWER CONTROL COMMAND PROCESSING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink closed-loop transmit power control (TPC) command processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a transmit power control (TPC) command that is based at least in part on a scheduled transmission of a sidelink communication; determining, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command; and selectively adjusting the transmit power of the UE based at least in part on determining whether to adjust the transmit power.

In some aspects, a UE for wireless communication may include memory and one or more processors operatively coupled to the memory. The memory and the one or more processors may be configured to receive a TPC command that is based at least in part on a scheduled transmission of a sidelink communication; determine, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command; and selectively adjust the transmit power of the UE based at least in part on determining whether to adjust the transmit power.

In some aspects, a non-transitory computer-readable medium may store one or more instructions for wireless communication. The one or more instructions, when executed by one or more processors of a UE, may cause the one or more processors to: receive a TPC command that is based at least in part on a scheduled transmission of a sidelink communication; determine, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command; and selectively adjust the transmit power of the UE based at least in part on determining whether to adjust the transmit power.

In some aspects, an apparatus for wireless communication may include means for receiving a TPC command that is based at least in part on a scheduled transmission of a sidelink communication; means for determining, based at least in part on refraining from transmitting the sidelink communication or transmitting the sidelink communication at a power that is lower than a power configured for the scheduled transmission of the sidelink communication, whether to adjust a transmit power of the apparatus based at least in part on the TPC command; and means for selectively adjusting the transmit power of the apparatus based at least in part on determining whether to adjust the transmit power.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
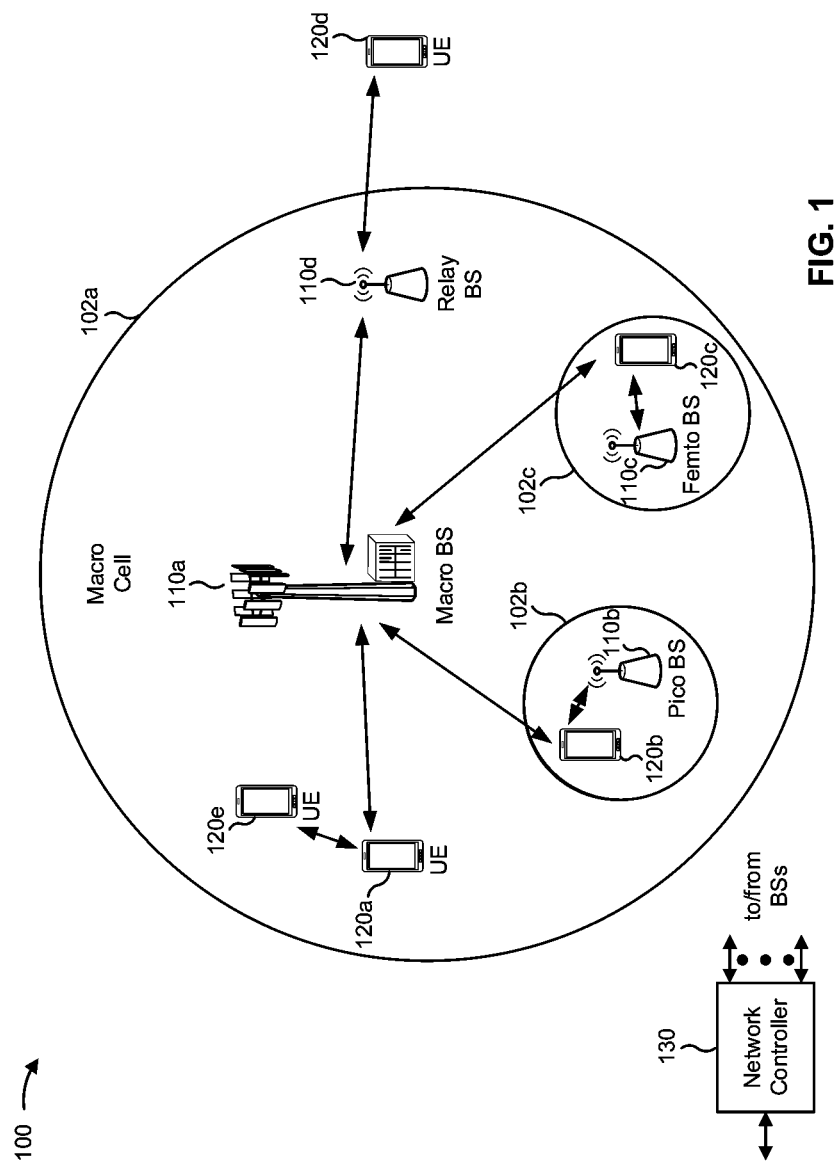
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
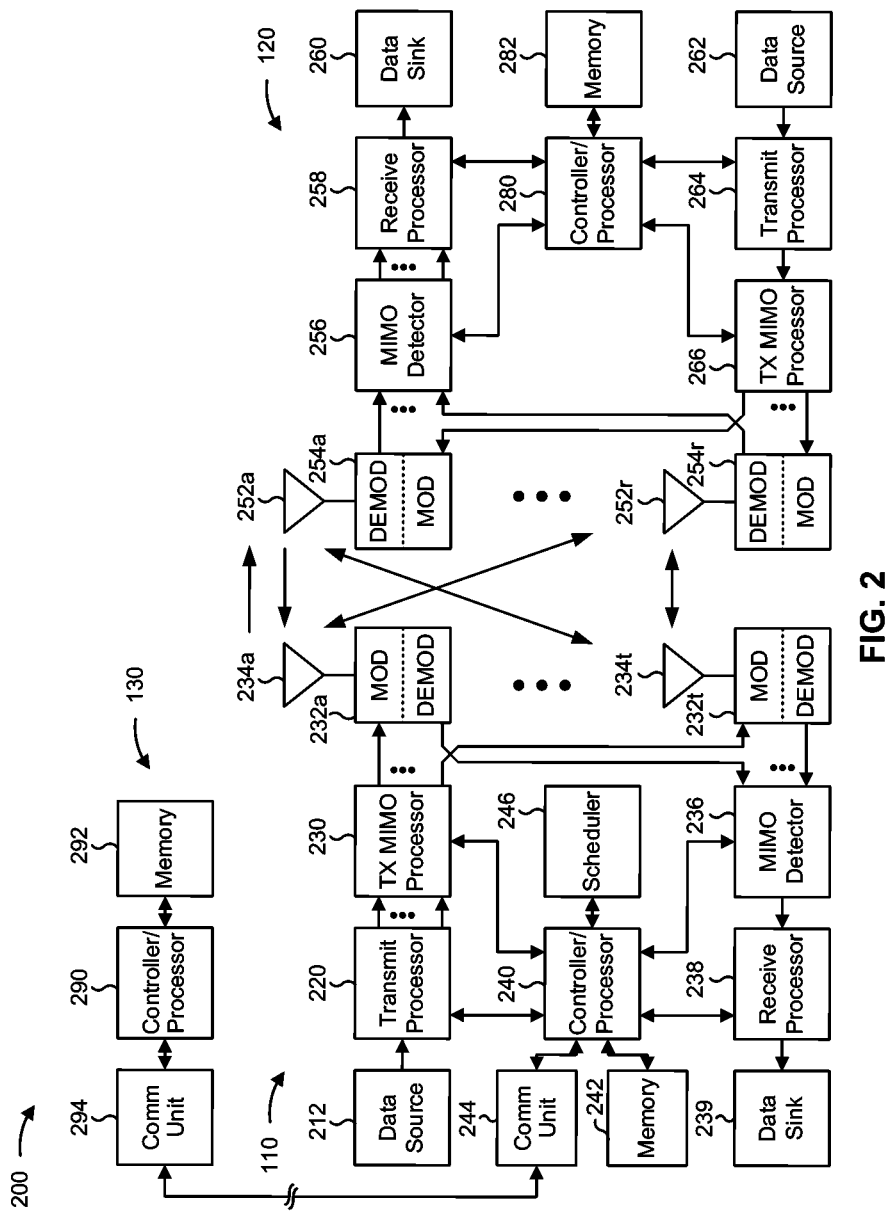
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink closed-loop transmit power control (TPC) command processing, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for receiving a TPC command that is based at least in part on a scheduled transmission of a sidelink communication, means for determining, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command, means for selectively adjusting the transmit power of the UE based at least in part on determining whether to adjust the transmit power, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
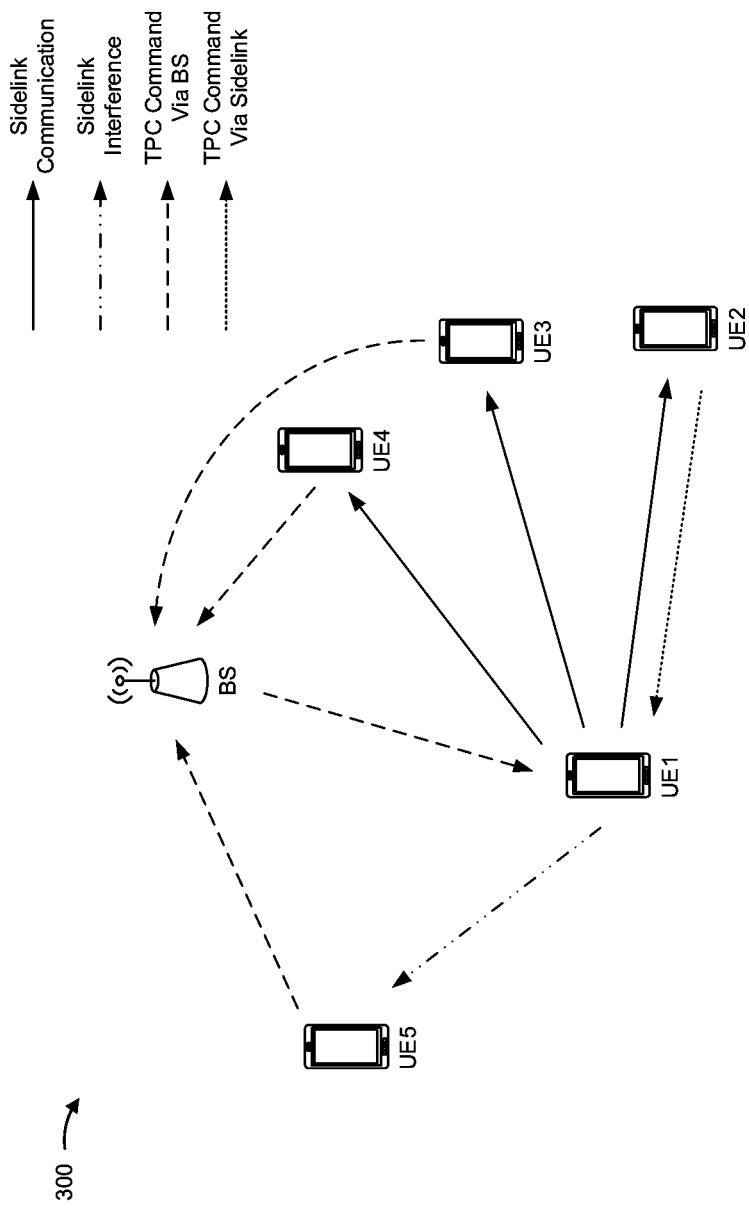
FIG. 3 is a block diagram illustrating one or more examples of a sidelink closed-loop transmit power control (TPC), in accordance with various aspects of the present disclosure.

FIG. 3 is a diagram illustrating one or more examples 300 of sidelink closed-loop TPC, in accordance with various aspects of the present disclosure. As shown in FIG. 3, example(s) 300 may include communication between a plurality of UEs (e.g., UE 120), such as UE1 through UE5, and a BS (e.g., BS 110). The plurality of UEs and the BS may be included in a wireless network, such as wireless network 100 and/or another wireless network. In some aspects, examples 300 may include a greater or fewer quantity of UEs, a greater quantity of BSs, and/or the like.

In some aspects, two or more of the UEs may communicate over a sidelink. For example, UE1 may transmit sidelink communications to, and/or receive sidelink communications from, UE2, UE3, UE4, and/or other UEs. In some aspects, one or more of the UEs may communicate over an access link with the BS. For example, one or more of the UEs may transmit uplink communications to the BS, may receive downlink communications from the BS, and/or the like.

In some aspects, the plurality of UEs and the BS may perform one or more actions and/or techniques associated with sidelink closed-loop TPC associated with UE1. Sidelink closed-loop TPC may include performing transmit power control based at least in part on feedback from a receiver of sidelink communications on a sidelink. For example, a UE may receive a sidelink communication from another UE, may perform one or more measurements associated with the sidelink communication (e.g., RSRP, RSSI, RSRQ, CQI, signal to noise ratio (SNR), and/or the like), and may transmit a TPC command to the other UE to provide feedback regarding the transmit power of the sidelink communication. The TPC command may be based at least in part on the results of the one or more measurements, and may be a command to increase the transmit power of the UE (e.g., so that future sidelink communications are transmitted with a greater transmit power), a command to decrease the transmit power of the UE (e.g., so that future sidelink communications are transmitted with lower transmit power), and/or the like.

In some aspects, a UE (e.g., a transmitter UE) may receive a TPC command directly from another UE that generated the TPC command (e.g., a receiver UE) on a sidelink, from one or more relaying UEs between the transmitter UE and the receiver UE, from one or more BSs (e.g., a BS that serves the transmitter UE, a BS that serves the receiver UE, a BS that serves the one or more relaying UEs, and/or the like), and/or the like.

As an example of the above, and as shown in FIG. 3, UE1 may transmit sidelink communications to UE2, UE3, and UE4. As further shown in FIG. 3, UE2 may transmit, based at least in part on the sidelink transmission, a TPC command directly to UE1 via a sidelink. As further shown in FIG. 3, UE3 and UE4 may each transmit, based at least in part on the sidelink transmission, a respective TPC command to the BS, which may relay the TPC commands to UE1 via an access link (e.g., a downlink). In some aspects, the BS may transmit the individual TPC commands to UE1, may consolidate the TPC commands into a single TPC command, may perform additional processing on the TPC commands, and/or the like.

Moreover, UE5 may or may not be radio resource control (RRC) connected with UE1, may or may not be monitoring data and/or control transmissions from UE1, and may be monitoring the wireless network for various types of interference, such as sidelink interference, access link interference, and/or the like. In this case, UE5 may receive sidelink interference due to the transmission of the sidelink communications to UE2-UE4. Accordingly, UE5 may perform one or more measurements of the received sidelink interference (e.g., RSRP), may generate a TPC command based at least in part on the results of the one or more measurements, and may transmit the TPC command to UE1 via the BS, via one or more relaying UEs, and/or the like.

In some aspects, UE1 may receive TPC commands in a sidelink communication from another UE. In some aspects, UE1 may receive TPC commands in a downlink communication from the BS. For example, UE1 may receive a TPC command from the BS in a downlink control information (DCI) communication, a medium access control (MAC) control element (MAC-CE), an RRC communication, and/or the like. As another example, UE1 may receive a TPC command in a grant, such as a downlink grant, an uplink grant, a sidelink grant, a configured grant, a dynamic grant, and/or the like.

UE1 may receive the TPC command(s) from UE2-UE5, from other UEs, and/or from the BS, and may adjust the transmit power of UE1 based at least in part on the TPC commands. For example, UE1 may increase, decrease, or maintain the transmit power based at least in part on a TPC command indicating that UE1 is to increase, decrease, or maintain the transmit power. In some aspects, UE1 may adjust the transmit power for the access link with the BS (e.g., uplink transmit power) based at least in part on a TPC command, may adjust the transmit power for the sidelink with UE2-UE4, and/or the like. In some aspects, UE1 may adjust the transmit power for a particular TPC loop (or TPC loops) based at least in part on a TPC command. In some aspects, the TPC loop may be associated with the uplink, the one or more sidelinks with UE2-UE4, and/or the like. In some aspects, the TPC loop may be associated with a particular channel of the uplink (e.g., physical uplink control channel (PUCCH), physical uplink shared channel (PUSCH), and/or the like), a particular channel of the one or more sidelinks (physical sidelink control channel (PSCCH), physical sidelink shared channel (PSSCH), physical sidelink feedback channel (PSFCH), physical sidelink broadcast channel (PSBCH), and/or the like), and/or the like.

In some aspects, UE1 may increase or decrease the transmit power at a magnitude indicated by the TPC command. For example, a TPC command generated by a receiver UE may identify an adjustment value, which may indicate the magnitude, that UE1 is to increase or decrease the transmit power, relative to a scale (e.g., −5 to +5, −1 to +1, −10 to +10, and/or the like). Moreover, the magnitude that UE1 is to increase or decrease the transmit power may be based at least in part on a step-size configured for the receiver UE. The step-size may control the increment at which the adjustment value may specified on the scale (e.g., in 1-value increments, in 5-value increments, and/or the like). In other words, the step-size may control the granularity for specifying the adjustment value in a TPC command.

As indicated above, FIG. 3 is provided as one or more examples. Other examples may differ from what is described with regard to FIG. 3.

A UE (e.g., a transmitter UE) may be scheduled to transmit a sidelink communication to one or more other UEs. In some cases, the UE may determine to refrain from transmitting the sidelink communication or may determine to transmit the sidelink communication at a modified transmit power (and/or at another modified transmission parameter) that is different from a configured or anticipated transmit power that the UE is scheduled to use to transmit the sidelink communication. For example, the UE may be configured to transmit the sidelink communication at a particular transmit power, but may transmit the sidelink communication at a lower transmit power than the configured transmit power due to determining that the configured transmit power would not satisfy a maximum permissible exposure (MPE) threshold, a peek to average power ratio (PAPR) threshold, and/or another transmit power threshold. As another example, the UE may refrain from transmitting the sidelink communication based at least in part on the transmission of the sidelink communication being preempted by more urgent traffic (e.g., ultra reliable low latency (URLLC) traffic, time-sensitive traffic, and/or the like).

In some cases, the one or more UEs may be unaware that the transmission of the sidelink communication was aborted or was performed with a modified transmission parameter. As a result, the one or more UEs may generate TPC commands based at least in part on measuring respective sidelinks with the UE during the time that was scheduled for the transmission of the sidelink communication. This may cause the one or more UEs to generate inaccurate and/or erroneous TPC commands because the TPC commands are generated in the absence of the sidelink communication or are generated based at least in part on the sidelink communication being transmitted with the modified transmission parameter, and thus are not based at least in part on accurate measurements of the sidelinks between the UE and the one or more other UEs. This, in turn, may cause the UE to perform closed-loop TPC based at least in part on inaccurate and/or erroneous TPC commands, which may cause the UE to transmit with higher transmit power than is needed (e.g., which may increase interference), may cause the UE to transmit with lower transmit power than is needed (e.g., which may cause a reduction in SNR at the one or more UEs), and/or the like.

Some aspects described herein provide techniques and apparatuses associated with sidelink closed-loop TPC command processing. In some aspects, a UE may be scheduled to transmit a sidelink communication to one or more other UEs, and may determine to refrain from transmitting the sidelink communication or may determine to transmit the sidelink communication with a modified transmission parameter that are different from a transmission parameter that the UE was configured to use to transmit the sidelink communication. The UE may receive a TPC command from another UE of the one or more other UEs. The TPC command may be based at least in part on the scheduled transmission of the sidelink communication.

The UE may determine whether to adjust a transmit power of the UE based at least in part on the TPC command and may selectively adjust the transmit power of the UE based at least in part on determining whether to adjust the transmit power. For example, the UE may determine to refrain from adjusting the transmit power based at least in part on receiving the TPC command during an anticipated time period for receiving the TPC command. As another example, the UE may determine to adjust the transmit power based at least in part on receiving the TPC command from a UE that is monitoring for interference, based at least in part on receiving the TPC command from a BS, and/or the like. This prevents or reduces the likelihood that the UE will perform closed-loop TPC based at least in part on inaccurate and/or erroneous TPC commands, which prevents or reduces the likelihood that the UE will transmit with higher transmit power than is needed (e.g., which may reduce interference, and/or may increase the UE's battery life), prevents or reduces the likelihood that the UE will transmit with lower transmit power than is needed (e.g., which may increase SNR at the one or more UEs), and/or the like.

Figure 4:
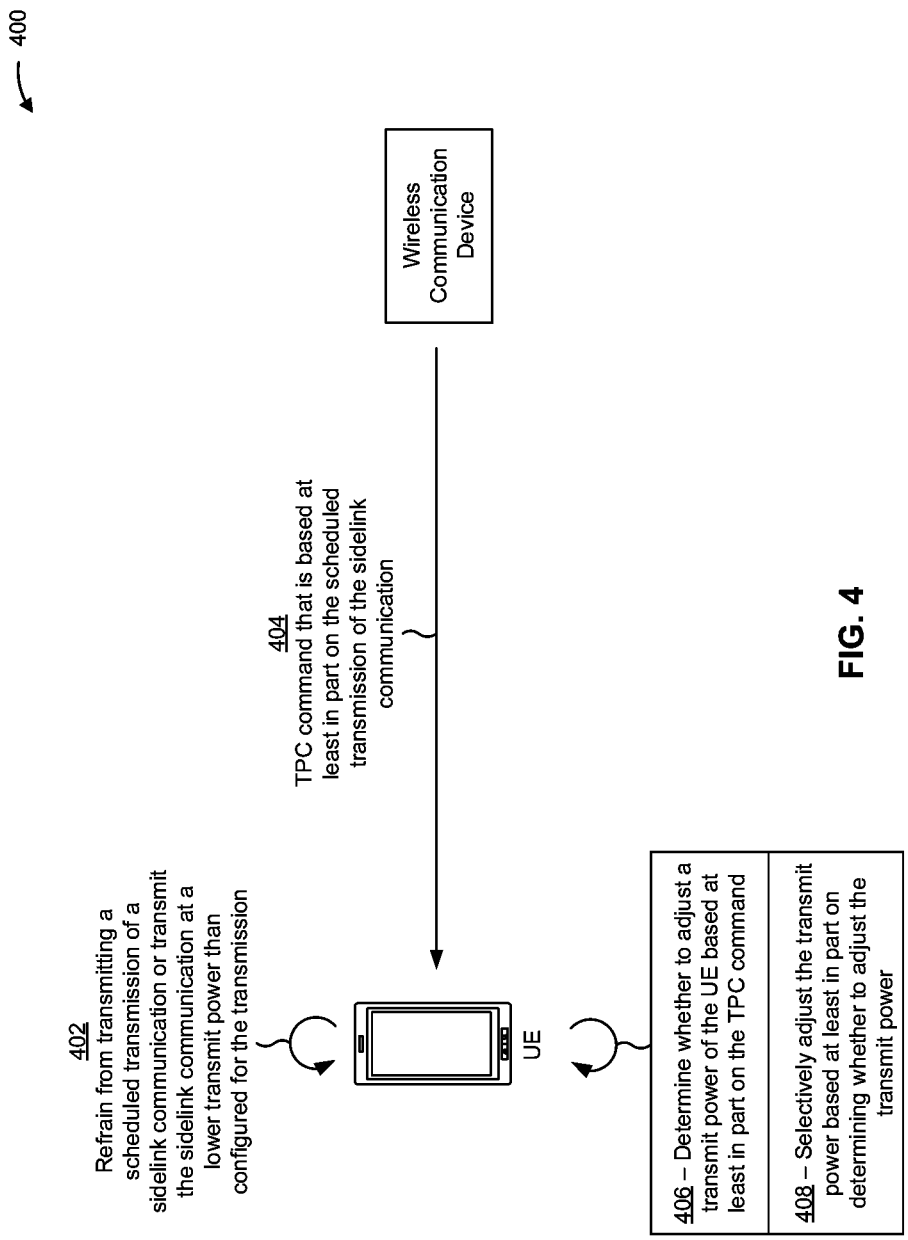
FIG. 4 is a diagram illustrating one or more examples of sidelink closed-loop TPC command processing, in accordance with various aspects of the present disclosure.

FIG. 4 is a diagram illustrating one or more examples 400 of sidelink closed-loop TPC command processing, in accordance with various aspects of the present disclosure. As shown in FIG. 4, example(s) 400 may include communication between a UE (e.g., UE 120) and a wireless communication device, such as a UE (e.g., UE 120), a BS (e.g., BS 110), and/or the like. The UE and the wireless communication device may be included in a wireless network, such as wireless network 100 and/or another wireless network.

In some aspects, the UE may transmit sidelink communications to other UEs in the wireless network. For example, the UE may transmit sidelink communications to the other UEs on a PSSCH, a PSCCH, a PSFCH, a PSBCH, a sidelink reference signal (RS) such as a channel state information reference signal (CSIRS), a sounding reference signal (SRS), and/or the like. The other UEs may perform one or more measurements of the sidelink communications, may generate TPC commands based at least in part on results of the one or more measurements, and may transmit the TPC commands to the UE so that the UE may perform sidelink closed-loop TPC based at least in part on the TPC commands.

In some aspects, the UE may be scheduled to transmit a sidelink communication. For example, the UE may receive a sidelink grant from a serving BS, may receive a sidelink grant from another UE, and/or the like. In some aspects, the UE may be configured to perform the scheduled transmission of the sidelink communication at a particular transmit power (e.g., an open-loop transmit power, a transmit power that is adjusted based at least in part on one or more previous TPC commands, and/or the like).

As shown in FIG. 4, and by reference number 402, the UE may refrain from transmitting the sidelink communication or may transmit the sidelink communication at a lower transmit power than the transmit power at which the UE is configured to transmit the sidelink communication. For example, the UE may transmit the sidelink communication at a lower transmit power than the transmit power at which the UE is configured to transmit the sidelink communication based at least in part on determining that the transmit power at which the UE is configured to transmit the sidelink communication would not satisfy an MPE threshold, a PAPR threshold, and/or another transmit power threshold. As another example, the UE may refrain from transmitting the sidelink communication based at least in part on the transmission of the sidelink communication being preempted by more urgent traffic (e.g., URLLC traffic, time-sensitive traffic, and/or the like).

As further shown in FIG. 4, and by reference number 404, the UE may receive a TPC command from the wireless communication device. In some aspects, the wireless communication device may be the receiver UE that generated the TPC command. In some aspects, the wireless communication device may be another UE or a BS that relays the TPC command from the receiver UE that generated the TPC command. In some aspects, the other UE or the BS may relay the TPC command for a receiver UE for various purposes, such as to reduce latency, if the receiver UE is not RRC connected with the UE, if a beam on which the receiver UE communicates with the UE is blocked, if the receiver UE is transmit power limited on a beam on which the receiver UE is to transmit the TPC command, and/or the like. In some aspects, the wireless communication device may be a BS that generates the TPC command based at least in part on one or more other TPC commands received from one or more receiver UEs.

The TPC command may be generated based at least in part on the scheduled transmission of the sidelink communication. In other words, the receiver UE that generated the TPC command may have generated the TPC command based at least in part on performing one or more measurements during a time at which the sidelink communication was scheduled to be transmitted. In this case, the receiver UE may perform the one or more measurements when no sidelink communication is transmitted (e.g., which may result in artificially and/or erroneously low measurements), when a different sidelink communication is transmitted (e.g., which may result in inaccurate measurements), and/or the like, and may generate an inaccurate and/or erroneous TPC command.

As further shown in FIG. 4, and by reference number 406, the UE may determine that the TPC command is associated with the sidelink communication, and accordingly may determine whether to adjust a transmit power of the UE based at least in part on the TPC command. In some aspects, the UE may determine that the TPC command is associated with the sidelink communication based at least in part on a timing between the scheduled transmission of the sidelink communication and receiving the TPC command. For example, the UE may determine that the TPC command is associated with the sidelink communication based at least in part on receiving the TPC command in a configured time window or time duration for receiving TPC commands associated with the scheduled transmission of the sidelink communication. As another example, the UE may determine that the TPC command is associated with the sidelink communication based at least in part on receiving the TPC command at a time that corresponds to the receiver UE's processing capability for generating and transmitting the TPC command.

In some aspects, the UE may determine to refrain from adjusting the transmit power of the UE based at least in part on determining that the TPC command is associated with the scheduled transmission of the sidelink communication. In this case, since the receiver UE may not be aware that the UE refrained from transmitting the sidelink communication or transmitted the sidelink communication at a lower transmit power than the transmit power at which the UE is configured to transmit the sidelink communication, the UE may determine that the TPC command is inaccurate and/or erroneous and accordingly may ignore, discard, and/or otherwise refrain from adjusting the transmit power of the UE.

In some aspects, the UE may determine to adjust the transmit power of the UE based at least in part on determining that the TPC command is provided for purposes of interference control for the receiver UE. In some aspects, the UE may determine that the TPC command is provided for purposes of interference control for the receiver UE based at least in part on receiving an indication that the TPC command is provided for purposes of interference control for the receiver UE. For example, the TPC command may indicate that the TPC command is provided for purposes of interference control. As another example, if the receiver UE relays the TPC command to the UE via a BS, the BS may transmit an indication to the UE that the TPC command is provided for purposes of interference control for the receiver UE.

In some aspects, the UE may determine to adjust the transmit power of the UE based at least in part on determining that the TPC command was received from a B S or a receiver UE that was aware that the UE refrained from transmitting the sidelink communication or transmitted the sidelink communication at a lower transmit power than the transmit power at which the UE is configured to transmit the sidelink communication. For example, if a receiver UE is aware that the UE refrained from transmitting the sidelink communication because the UE was scheduled with another sidelink communication that preempted the transmission of the sidelink communication, the receiver UE may provide a TPC command for the other sidelink communication, which the UE may use for closed-loop TPC of the sidelink channel on which the other sidelink communication was transmitted.

As further shown in FIG. 4, and by reference number 408, the UE may selectively adjust the transmit power of the UE based at least in part on determining whether to adjust the transmit power. For example, if the UE determines to refrain from adjusting the transmit power, the UE may refrain from adjusting the transmit power and may continue to transmit sidelink and/or access link communications at the transmit power configured for the UE. As another example, if the UE determines to adjust the transmit power, the UE may adjust the transmit power based at least in part on whether the TPC command indicates that the UE is to increase or decrease the transmit power, may adjust the transmit power based at least in part on an adjustment value identified by the TPC command, and/or the like.

In this way, the UE may determine whether to adjust a transmit power of the UE based at least in part on the TPC command and may selectively adjust the transmit power of the UE based at least in part on determining whether to adjust the transmit power. For example, the UE may determine to refrain from adjusting the transmit power based at least in part on receiving the TPC command during an anticipated time period for receiving the TPC command. As another example, the UE may determine to adjust the transmit power based at least in part on receiving the TPC command from a UE that is monitoring for interference, based at least in part on receiving the TPC command from a BS, and/or the like. This prevents or reduces the likelihood that the UE will perform closed-loop TPC based at least in part on inaccurate and/or erroneous TPC commands, which prevents or reduces the likelihood that the UE will transmit with higher transmit power than is needed (e.g., which may reduce interference, and/or conserve UE's battery charge/life), prevents or reduces the likelihood that the UE will transmit with lower transmit power than is needed (e.g., which may increase SNR at the one or more UEs), and/or the like. Note that the UE may not process and apply each received TPC command separately, but may instead combine (for example, accumulate) multiple received TPC commands from one or more sources and then apply the resulting power adjustment. In such a case, the UE may ignore or omit from this combining, the TPC commands known to have been generated based on reception of an aborted transmission or a transmission sent at a lower power than is expected by the receiver.

As indicated above, FIG. 4 is provided as one or more examples. Other examples may differ from what is described with respect to FIG. 4.

FIG. 5 is a diagram illustrating an example process 500 performed, for example, by a UE, in accordance with various aspects of the present disclosure. Example process 500 is an example where a UE (e.g., UE 120 and/or the like) performs operations associated with sidelink closed-loop TPC command processing.

As shown in FIG. 5, in some aspects, process 500 may include receiving a TPC command that is based at least in part on a scheduled transmission of a sidelink communication (block 510). For example, the UE (e.g., using receive processor 258, transmit processor 264, controller/processor 280, memory 282, and/or the like) may receive a TPC command that is based at least in part on a scheduled transmission of a sidelink communication, as described above.

As further shown in FIG. 5, in some aspects, process 500 may include determining, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command (block 520). For example, the UE (e.g., using receive processor 258, transmit processor 264, controller/processor 280, memory 282, and/or the like) may determine, based at least in part on refraining from transmitting the sidelink communication or transmitting the sidelink communication at a power that is lower than a power configured for the scheduled transmission of the sidelink communication, whether to adjust a transmit power of the UE based at least in part on the TPC command, as described above.

As further shown in FIG. 5, in some aspects, process 500 may include selectively adjusting the transmit power of the UE based at least in part on determining whether to adjust the transmit power (block 530). For example, the UE (e.g., using receive processor 258, transmit processor 264, controller/processor 280, memory 282, and/or the like) may selectively adjust the transmit power of the UE based at least in part on determining whether to adjust the transmit power, as described above.

Process 500 may include additional aspects, such as any single aspect or any combination of aspects described below and/or in connection with one or more other processes described elsewhere herein.

In a first aspect, determining whether to adjust the transmit power of the UE based at least in part on the TPC command comprises determining to refrain from adjusting the transmit power of the UE, and selectively adjusting the transmit power comprises refraining from adjusting the transmit power of the UE based at least in part on determining to refrain from adjusting the transmit power of the UE. In a second aspect, alone or in combination with the first aspect, process 500 further comprises determining that the TPC command is associated with the sidelink communication based at least in part on a timing between the scheduled transmission of the sidelink communication and receiving the TPC command.

In a third aspect, alone or in combination with one or more of the first and second aspects, determining whether to adjust the transmit power of the UE based at least in part on the TPC command comprises determining to adjust the transmit power of the UE based at least in part on receiving an indication that the TPC command is for purposes of interference control, and selectively adjusting the transmit power comprises adjusting the transmit power of the UE based at least in part on determining to adjust the transmit power of the UE. In a fourth aspect, alone or in combination with one or more of the first through third aspects, determining whether to adjust the transmit power of the UE based at least in part on the TPC command comprises determining to adjust the transmit power of the UE based at least in part on determining that the TPC command was received from a base station or another UE that was aware that the UE refrained from transmitting the sidelink communication or transmitted the sidelink communication at the power that is lower than the power configured for the scheduled transmission of the sidelink, and selectively adjusting the transmit power comprises adjusting the transmit power of the UE based at least in part on determining to adjust the transmit power of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   receiving a sidelink grant associated with scheduling a transmission of a first sidelink communication via a first sidelink channel;
   transmitting, via a second sidelink channel, a second sidelink communication during a time associated with the transmission of the first sidelink communication based at least in part the second sidelink communication preempting the first sidelink communication;
   receiving a transmit power control (TPC) command that is based at least in part on one or more measurements performed by a second UE during the time associated with the transmission of the first sidelink communication;
   determining that the second UE is aware that the first sidelink communication was not transmitted; and
   utilizing the TPC command for closed-loop TPC of the second sidelink channel on which the second sidelink communication was transmitted based at least in part on the second sidelink communication preempting the first sidelink communication.

2. The method of claim 1, further comprising:
   determining that the TPC command is associated with the first sidelink communication based at least in part on a timing between the scheduled transmission of the first sidelink communication and receiving the TPC command.

3. The method of claim 1, further comprising:
   determining to adjust the transmit power of the first UE for a subsequent sidelink communication transmitted via the first sidelink channel based at least in part on receiving an indication that the TPC command is for purposes of interference control; and
   adjusting the transmit power of the first UE for the subsequent sidelink communication based at least in part on determining to adjust the transmit power of the first UE.

4. A first user equipment (UE) for wireless communication, comprising:
   one or more memories; and
   one or more processors coupled to the one or more memories, the one or more processors individually or collectively configured to:
   receive a sidelink grant associated with scheduling a transmission of a first sidelink communication via a first sidelink channel;
   transmit, via a second sidelink channel, a second sidelink communication during a time associated with the transmission of the first sidelink communication based at least in part the second sidelink communication preempting the first sidelink communication;
   receive a transmit power control (TPC) command that is based at least in part on one or more measurements performed by a second UE during the time associated with the transmission of the first sidelink communication;

determine that the second UE is aware that the first sidelink communication was not transmitted; and utilize the TPC command for closed-loop TPC of the second sidelink channel on which the second sidelink communication was transmitted based at least in part on the second sidelink communication preempting the first sidelink communication.

5. The first UE of claim 4, wherein the one or more processors are further configured to:

determine that the TPC command is associated with the first sidelink communication based at least in part on a timing between the scheduled transmission of the first sidelink communication and receiving the TPC command.

6. The first UE of claim 4, wherein the one or more processors are further configured to:

determine to adjust the transmit power of the first UE for a subsequent sidelink communication transmitted via the first sidelink channel based at least in part on receiving an indication that the TPC command is for purposes of interference control; and adjust the transmit power of the first UE for the subsequent sidelink communication based at least in part on determining to adjust the transmit power of the first UE.

7. A non-transitory computer-readable medium storing one or more instructions for wireless communication, the one or more instructions comprising:

one or more instructions that, when executed by one or more processors of a first user equipment (UE), cause the one or more processors to:

receive a sidelink grant associated with scheduling a transmission of a first sidelink communication via a first sidelink channel;

transmit, via a second sidelink channel, a second sidelink communication during a time associated with the transmission of the first sidelink communication based at least in part the second sidelink communication preempting the first sidelink communication;

receive a transmit power control (TPC) command that is based at least in part on one or more measurements performed by a second UE during the time associated with the transmission of the first sidelink communication;

determine that the second UE is aware that the first sidelink communication was not transmitted; and utilize the TPC command for closed-loop TPC of the second sidelink channel on which the second sidelink communication was transmitted based at least in part on the second sidelink communication preempting the first sidelink communication.

8. The non-transitory computer-readable medium of claim 7, wherein the one or more instructions, when executed by the one or more processors, further cause the one or more processors to:

determine that the TPC command is associated with the first sidelink communication based at least in part on a timing between the scheduled transmission of the first sidelink communication and receiving the TPC command.

9. The non-transitory computer-readable medium of claim 7, wherein the one or more instructions, when executed by the one or more processors, further cause the one or more processors to:

determine to adjust the transmit power of the first UE for a subsequent sidelink communication transmitted via the first sidelink channel based at least in part on receiving an indication that the TPC command is for purposes of interference control; and adjust the transmit power of the first UE for the subsequent sidelink communication based at least in part on determining to adjust the transmit power of the first UE.

10. A first apparatus for wireless communication, comprising:

means for receiving a sidelink grant associated with scheduling a transmission of a first sidelink communication via a first sidelink channel;

means for transmitting, via a second sidelink channel, a second sidelink communication during a time associated with the transmission of the first sidelink communication based at least in part the second sidelink communication preempting the first sidelink communication;

means for receiving a transmit power control (TPC) command that is based at least in part on one or more measurements performed by a second apparatus during the time associated with the transmission of the first sidelink communication;

means for determining that the second apparatus is aware that the first sidelink communication was not transmitted; and means for utilizing the TPC command for closed-loop TPC of the second sidelink channel on which the second sidelink communication was transmitted based at least in part on the second sidelink communication preempting the first sidelink communication.

11. The first apparatus of claim 10, further comprising:

means for determining that the TPC command is associated with the first sidelink communication based at least in part on a timing between the scheduled transmission of the first sidelink communication and receiving the TPC command.

12. The first apparatus of claim 10, further comprising:

means for adjusting the transmit power of the apparatus for a subsequent sidelink communication transmitted via the first sidelink channel based at least in part on receiving an indication that the TPC command is for purposes of interference control.

13. The method of claim 1, further comprising:

determining that the TPC command is associated with the first sidelink communication based at least in part on receiving the TPC command in a time duration configured for receiving TPC commands associated with the scheduled transmission of the first sidelink communication.

14. The first UE of claim 4, wherein the one or more processors are further configured to:

determine that the TPC command is associated with the first sidelink communication based at least in part on receiving the TPC command in a time duration configured for receiving TPC commands associated with the scheduled transmission of the first sidelink communication.

15. The non-transitory computer-readable medium of claim 7, wherein the one or more instructions, when executed by the one or more processors, further cause the one or more processors to:

determine that the TPC command is associated with the first sidelink communication based at least in part on receiving the TPC command in a time duration configured for receiving TPC commands associated with the scheduled transmission of the first sidelink communication.

16. The first apparatus of claim 10, further comprising:
means for determining that the TPC command is associated with the first sidelink communication based at least in part on receiving the TPC command in a time duration configured for receiving TPC commands associated with the scheduled transmission of the first sidelink communication.

17. The method of claim 1, further comprising:
determining that the TPC command is associated with the first sidelink communication based at least in part on receiving the TPC command at a time that corresponds to a processing capability, of the second UE, for generating and transmitting the TPC command.

18. The first UE of claim 4, wherein the one or more processors are further configured to:
determine that the TPC command is associated with the first sidelink communication based at least in part on receiving the TPC command at a time that corresponds to a processing capability, of the second UE, for generating and transmitting the TPC command.

19. The non-transitory computer-readable medium of claim 7, wherein the one or more instructions, when executed by the one or more processors, further cause the one or more processors to:
determine that the TPC command is associated with the first sidelink communication based at least in part on receiving the TPC command at a time that corresponds to a processing capability, of the second UE, for generating and transmitting the TPC command.

20. The first apparatus of claim 10, further comprising:
means for determining that the TPC command is associated with the first sidelink communication based at least in part on receiving the TPC command at a time that corresponds to a processing capability, of the second apparatus, for generating and transmitting the TPC command.

* * * * *